(12) United States Patent
Chen et al.

(10) Patent No.: US 11,051,308 B2
(45) Date of Patent: Jun. 29, 2021

(54) FACILITATING APPLICATION AND/OR TRAFFIC STATUS AWARE INTELLIGENT CARRIER AGGREGATION IN ADVANCED NETWORKS

(71) Applicant: AT&T Intellectual Property I, L.P., Atlanta, GA (US)

(72) Inventors: Ye Chen, Milton, GA (US); Michael Prise, Kirkland, WA (US); Hongyan Lei, Plano, TX (US); Jason Sikes, Carnation, WA (US); Todd Zeiler, Sharpsburg, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

(21) Appl. No.: 16/427,957

(22) Filed: May 31, 2019

(65) Prior Publication Data
US 2020/0383101 A1 Dec. 3, 2020

(51) Int. Cl.
*H04W 72/04* (2009.01)
*H04W 24/08* (2009.01)

(52) U.S. Cl.
CPC ......... *H04W 72/048* (2013.01); *H04W 24/08* (2013.01)

(58) Field of Classification Search
None
See application file for complete search history.

(56) References Cited

U.S. PATENT DOCUMENTS

2015/0327198 A1* 11/2015 Axmon ............... H04L 5/001
370/336

OTHER PUBLICATIONS

"Technical review of RRM for carrier aggregation in LTE-Advanced"; Article • Sep. 2016; Haitham Saleh et al.; hereafter Saleh (Year: 2016).*

* cited by examiner

*Primary Examiner* — Chi H Pham
*Assistant Examiner* — Raul Rivas
(74) *Attorney, Agent, or Firm* — Amin, Turocy & Watson, LLP

(57) ABSTRACT

Facilitating application and/or traffic status aware intelligent carrier aggregation in advanced networks is provided herein. Operations of a method can comprise analyzing a traffic usage parameter of a mobile device and, based on a first determination that the traffic usage parameter consumes more uplink resources than downlink resources, configuring, the mobile device with an uplink carrier aggregation based on a first maximization of the uplink carrier aggregation and, thereafter, configuring the mobile device with an allowable downlink carrier aggregation. Alternatively, based on a second determination that the traffic usage parameter consumes more downlink resources than uplink resources, configuring the mobile device with a downlink carrier aggregation based on a second maximization of the downlink carrier aggregation and, thereafter, configuring the mobile device with an allowable uplink carrier aggregation. The uplink carrier aggregation and the downlink carrier aggregation can be non-static carrier aggregations.

20 Claims, 10 Drawing Sheets

FACILITATING APPLICATION AND/OR TRAFFIC STATUS AWARE INTELLIGENT CARRIER AGGREGATION IN ADVANCED NETWORKS

TECHNICAL FIELD

This disclosure relates generally to the field of mobile communications and, more specifically, to facilitating carrier aggregation in advanced networks (e.g., 5G and beyond).

BACKGROUND

In wireless communications systems, carrier aggregation is a procedure that attempts to aggregate different carriers. Accordingly, carrier aggregation can increase the data rate per user equipment device due to an increase in bandwidth. The data speed at which the device can transmit depends on how much bandwidth it is using to the transmit. In a similar manner, the data speed at which the device can receive depends on how much bandwidth it is using to receive. In both cases, the more bandwidth available; the higher the speed. The bandwidth available to transmit is dependent, at least in part, on an uplink carrier aggregation, the bandwidth available to receive is dependent, at least in part, on the downlink carrier aggregation.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Various non-limiting embodiments are further described with reference to the accompanying drawings in which.

DETAILED DESCRIPTION

Figure 1:
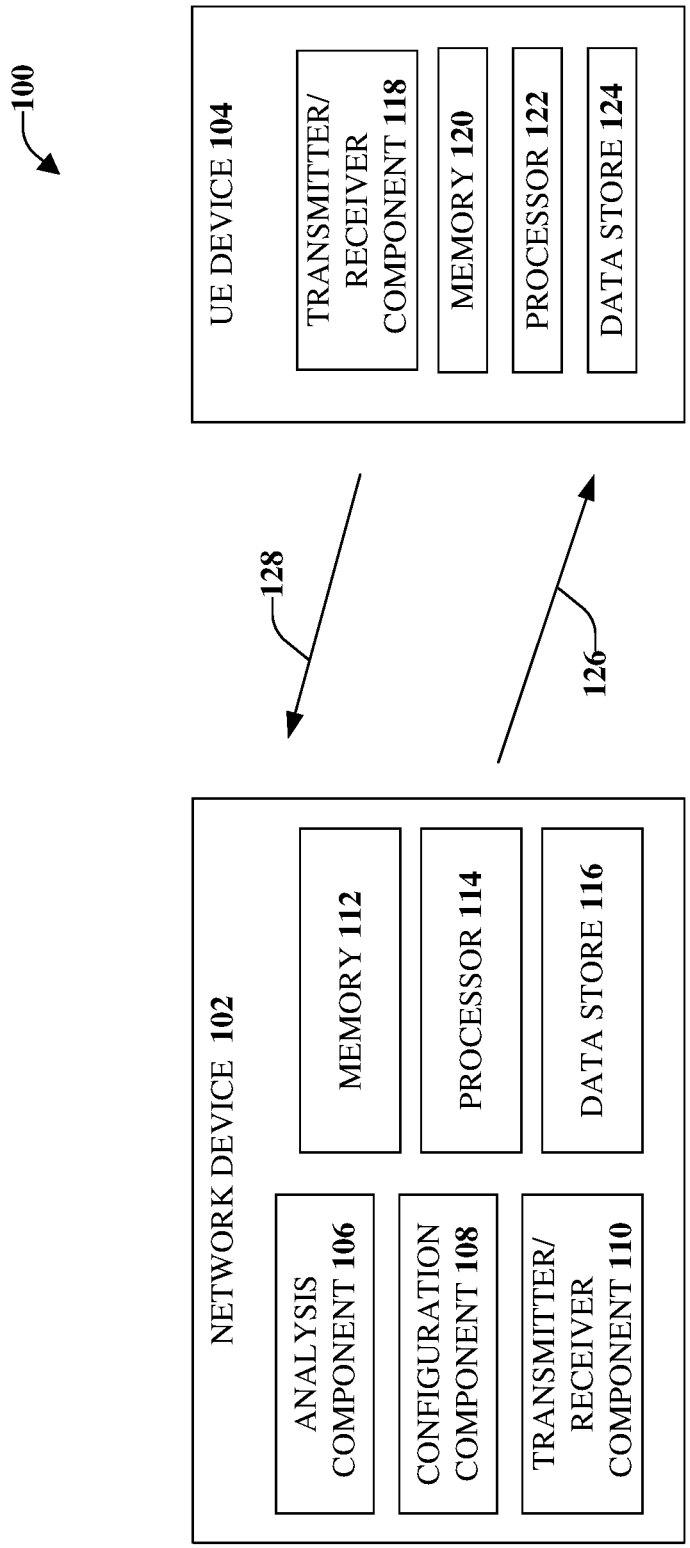
FIG. 1 illustrates an example, non-limiting, system that facilitates application and/or traffic status aware intelligent carrier aggregation in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

In a traditional Radio Access Network (RAN) system that supports both uplink and downlink carrier aggregation (e.g., a Long Term Evolution (LTE) system, 5G New Radio (NR) system), as it relates to uplink and downlink carrier aggregation configuration, the strategy is either favoring uplink or downlink with static preference. For example, a site has up to five carriers to aggregate at the downlink and up to two carriers to aggregated at the uplink. For a given User Equipment (UE) device, due to various reasons (e.g. device capability, 3GPP standard limitation, and so forth), the carrier aggregation can be configured as downlink five component carrier (CC) carrier aggregation but cannot perform uplink carrier aggregation at substantially the same time. Alternatively, the same UE device can be assigned a maximum two CC uplink carrier aggregation but can only be assigned up to three CC downlink carrier aggregation.

Due to the above-mentioned static preference, if it is set "downlink preferred," the UE device will always perform five CC downlink carrier aggregation without uplink carrier aggregation. Alternatively, if the UE device is set to "uplink preferred," the UE device will always perform two CC uplink carrier aggregation and three CC downlink carrier aggregation. If the UE device does uplink centric application but the preference is set to downlink, the UE device will not be able to enjoy uplink carrier aggregation and higher uplink data rate. Alternatively, if the UE device does downlink centric application but the preference is set to uplink, the UE device will not be able to do maximum five CC downlink carrier aggregation and has the highest downlink data rate.

Accordingly, various embodiments are described herein to facilitate application and/or traffic status aware intelligent carrier aggregation in advanced networks. More specifically, the disclosed aspects relate to a generic mechanism to intelligently configure uplink and/or downlink carrier aggregation based on the application executing on the UE devices and/or respective traffic status of the uplink and/or the downlink.

For example, if the user (e.g., via the UE device) is performing an uplink centric application (e.g., uploading a large amount of data, uploading a video, performing an uplink speed test, and so on), the RAN (e.g., Long Term Evolution (LTE) eNB, 5G NR, and so on) can configure the uplink and downlink carrier aggregation combination in order to maximize the uplink carrier aggregation. Alternatively, if the user (e.g., via the UE device) is performing a downlink centric application (e.g., downloading a large amount of data, downloading a video, performing a downlink speed test, and so on), the network device can configure the uplink and downlink carrier aggregation combination in order to maximize the downlink carrier aggregation.

It is noted that various aspects might be discussed herein with respect to LTE systems as an example system. However, the various aspects (e.g., the application and/or traffic aware principles) can be applied to other systems that utilize carrier aggregation. Such systems include, but are not limited to, 5G NR systems and other advanced systems.

According to an embodiment, provided is a system that can comprise a processor and a memory that stores executable instructions that, when executed by the processor, facilitate performance of operations. The operations can comprise evaluating a usage parameter of a user equipment device. The usage parameter can be one usage parameter selected from a group of parameters. The group can comprise an uplink centric usage parameter and a downlink centric usage parameter. The operations also can comprise, based on the evaluation indicating that the usage parameter is the uplink centric usage parameter, configuring the user equipment device with an uplink carrier aggregation that comprises maximizing the uplink carrier aggregation and performing allowable downlink carrier aggregation after the maximizing the uplink carrier aggregation. Further, the operations can comprise, based on the evaluation indicating that the usage parameter is the downlink centric usage parameter, configuring the user equipment device with a downlink carrier aggregation that comprises maximizing the downlink carrier aggregation and performing allowable uplink carrier aggregation after the maximizing the downlink carrier aggregation. The uplink carrier aggregation and the downlink carrier aggregation can be non-static carrier aggregations.

In an example, evaluating the usage parameter can comprise analyzing a network traffic pattern associated with the user equipment device. Further to this example, the operations can comprise determining the network traffic pattern is downlink centric based on a first quantity of downlink network traffic being received at the user equipment device being determined to be larger than a second quantity of uplink network traffic being sent by the user equipment device. Further, the operations can comprise determining the network traffic pattern is uplink centric based on the second quantity of uplink network traffic being sent by the user equipment device being determined to be larger than the first quantity of downlink network traffic being received at the user equipment device.

According to some implementations, evaluating the usage parameter can comprise analyzing an application executing on the user equipment device. Further to these implementations, the operations can comprise determining the usage parameter is the uplink centric usage parameter based on a first utilization of uplink resources by the application executing on the user equipment device being determined to be more than a second utilization of downlink resources by the application executing on the user equipment device. Additionally, evaluating the usage parameter can comprise analyzing the application executing on the user equipment device and the operations can comprise determining the usage parameter is the downlink centric usage parameter based on a first utilization of downlink resources by the application executing on the user equipment device being determined to be more than a second utilization of uplink resources by the application executing on the user equipment device.

In some implementations, evaluating the usage parameter can comprise analyzing a first priority of uplink network traffic and a second priority of downlink network traffic.

The operations can comprise, according to some implementations, evaluating a first quantity of uplink network traffic and a second quantity of downlink network traffic. The first quantity of uplink network traffic and the second quantity of downlink network traffic can be associated with the user equipment device and other user equipment devices within a wireless communications network other than the user equipment device.

In some implementations, evaluating the usage parameter can comprise comparing a first delay sensitivity of an uplink communication with a second delay sensitivity of a downlink communication.

According to some implementations, the operations can comprise facilitating a transmission of a configuration message to the user equipment device. The configuration message can comprise a first indication of the uplink carrier aggregation based on the evaluation indicating that the usage parameter is the uplink centric usage parameter, or a second indication of the downlink carrier aggregation based on the evaluation indicating that the usage parameter is the downlink centric usage parameter. In an example, facilitating the transmission can comprise sending the transmission as a radio resource control configuration message.

Another embodiment can relate to a method that can comprise analyzing, by a network device comprising a processor, a traffic usage parameter of a mobile device. The method also can comprise performing one action from a group of actions depending on a result of the analyzing. The group of actions can comprise, based on a first determination that the traffic usage parameter consumes more uplink resources than downlink resources, configuring, by the network device, the mobile device with an uplink carrier aggregation based on a first maximization of the uplink carrier aggregation and configuring, by the network device, the mobile device with an allowable downlink carrier aggregation after the first maximization of the uplink carrier aggregation. The group of actions also can comprise, based on a second determination that the traffic usage parameter consumes more downlink resources than uplink resources, configuring, by the network device, the mobile device with a downlink carrier aggregation based on a second maximization of the downlink carrier aggregation and configuring, by the network device, the mobile device with an allowable uplink carrier aggregation after the second maximization of the downlink carrier aggregation.

According to some implementations, the one action of the group of actions can be one initial action of an initial group of actions and the traffic usage parameter can be a first traffic usage parameter. Further to these implementations, the method can comprise analyzing, by the network device, a second traffic usage pattern of the mobile device after a defined interval and performing one subsequent action of a subsequent group of actions. The subsequent group of actions can comprise, based on a third determination that the second traffic usage pattern indicates a consumption of more uplink resources than downlink resources, configuring, by the network device, the mobile device with the uplink carrier aggregation. The subsequent group of actions also can comprise, based on a fourth determination that the second traffic usage pattern indicates the consumption of more downlink resources than uplink resources, configuring, by the network device, the mobile device with the downlink carrier aggregation. Further to these implementations, the uplink carrier aggregation and the downlink carrier aggregation can be non-static carrier aggregations.

The method can comprise, according to some implementations, sending, by the network device, a radio resource control configuration message to the mobile device. The radio resource control configuration message can comprise a first indication of the uplink carrier aggregation or a second indication of the downlink carrier aggregation.

Another embodiment can relate to a machine-readable storage medium, comprising executable instructions that, when executed by a processor, facilitate performance of operations. The operations can comprise determining a centricity of a user equipment device, wherein the centricity is one of an uplink centric status and a downlink centric status. The operations also can comprise, based on the centricity being the uplink centric status, configuring the user equipment device with uplink carrier aggregation and configuring the user equipment device with available downlink carrier aggregation after the configuring with the uplink carrier aggregation. Further, the operations can comprise, based on the centricity being the downlink centric status, configuring the user equipment device with downlink carrier aggregation and configuring the user equipment device with available uplink carrier aggregation after the configuring with the downlink carrier aggregation.

In an example, determining the centricity of the user equipment device can comprise evaluating the centricity of an application executing on the user equipment device.

According to some implementations, determining the centricity of the user equipment device can comprise evaluating a network traffic usage associated with the user equipment device. Further to these implementations, the operations can comprise, based on a determination that the traffic usage pattern consumes more uplink resources than downlink resources, configuring the user equipment device with the uplink carrier aggregation prior to the configuring the user equipment device with the available downlink carrier aggregation.

In alternative, or additional, implementations, determining the centricity of the user equipment device can comprise evaluating a network traffic usage associated with the user equipment device. Further to these implementations, the operations can comprise, based on a determination that the network traffic usage consumes more downlink resources than uplink resources, configuring the user equipment device with the downlink carrier aggregation prior to the configuring the user equipment device with the available uplink carrier aggregation.

In some implementations, the operations can comprise transmitting a radio resource control configuration message to the user equipment device. The radio resource control configuration message can comprise a first indication of the uplink carrier aggregation or a second indication of the downlink carrier aggregation.

Referring initially to FIG. 1, illustrated is an example, non-limiting, system 100 that facilitates application and/or traffic status aware intelligent carrier aggregation in advanced networks in accordance with one or more embodiments described herein.

Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a network device 102 and a UE device 104. The network device 102 can be included in a group of network devices of a wireless communications network. Although only a single network device and a single UE device are shown and described, the various aspects are not limited to this implementation. Instead, multiple network devices and/or multiple UE devices can be included in a communications system.

The network device 102 can comprise an analysis component 106, a configuration component 108, a transmitter/receiver component 110, at least one memory 112, at least one processor 114, and at least one data store 116. The UE device 104 can comprise a transmitter/receiver component 118, at least one memory 120, at least one processor 122, and at least one data store 124.

A communication from the network device 102 (e.g., via the transmitter/receiver component 110) to the UE device 104 (e.g., via the transmitter/receiver component 118) is referred to as a downlink communication, or simply the downlink 126. Further, a communication from the UE device 104 (e.g., via the transmitter/receiver component 118) to the network device 102 (e.g., via the transmitter/receiver component 110) is referred to as an uplink communication, or simply the uplink 128.

The analysis component 106 can determine whether the UE device 104 is performing a downlink centric application or an uplink centric application. For example, the analysis component 106 can evaluate data traffic experienced by the UE device 104 and determine whether more focus should be placed on the downlink 126 due to a downlink centric application executing on the UE device 104, or whether more focus should be placed on the uplink 128 due to an uplink centric application executing on the UE device 104.

For example, the downlink centric application could be associated with a large file being downloaded from the network device 102, a movie or other digital content being streamed (or downloaded from) the network device 102, a speed test measuring a data speed of the downlink 126, or another type of download from the network device 102 to the UE device 104. In another example, the uplink concentric application could be associated with a large file being uploaded to the network device 102, a movie or other digital content being streamed (or uploaded to) the network device 102, a speed test measuring a data speed of the uplink 128, or another type of uplink communication from the UE device 104 to the network device 102.

According to some implementations, to determine the centricity of the application (e.g., download centric, upload centric) information can be received at the network device 102 (e.g., via the transmitter/receiver component 110) from the UE device 104 (e.g., via the transmitter/receiver component 118). The data can be received based on various information provided by the UE device 104 on request from the network device 102, or automatically based on various messages exchanged between the network device 102 and the UE device 104.

The configuration component 108 can choose the optimal (or as near optimal as possible) uplink carrier aggregation configuration and/or downlink carrier aggregation configuration based on the determination by the analysis component 106 whether the UE device 104 is executing a downlink centric application or an uplink centric application. In an example, the carrier aggregation configuration (either uplink or downlink) can be based on the application the wireless user is running (e.g., that is executing on the UE device 104). Accordingly, there is no static downlink or uplink carrier aggregation preference.

In an example, if the UE device 104 is executing a downlink centric application (e.g., downlink speed testing, download large file, or another downlink function), the network device 102 can intelligently detect the traffic pattern, and can configure the UE device 104 to five CC downlink carrier aggregation without uplink carrier aggregation, as an example.

In another example, if the UE device 104 is executing an uplink centric application (e.g., uplink speed testing, uploading a large file, or anther downlink function), the network device 102 can intelligently detect the traffic pattern, and can configure the UE device 104 to uplink two CC carrier aggregation and three CC downlink carrier aggregation, as another example. According to some implementations, the transition of different uplink/downlink carrier aggregation configurations might utilize Radio Resource Control (RRC) reconfiguration message(s).

If the UE device 104 is performing both uplink and downlink heavy applications (which could be less likely), the network device 102 can choose the higher downlink carrier aggregation or higher uplink carrier aggregation based on application priority. For example, the network device 102 can maintain a configurable application category priority list based on speed and latency, for example.

The transmitter/receiver component 110 can transmit a configuration message to the UE device 104. For example, the configuration message can comprise a first indication of the uplink carrier aggregation and a second indication of the downlink carrier aggregation. According to some implementations, the transmission can be sent by the transmitter/receiver component 110 as a radio resource control configuration message, which can be received at the UE device 104 via the transmitter/receiver component 118.

The transmitter/receiver component 110 can be configured to transmit to, and/or receive data from, the UE device 104, other network devices, and/or other UE devices. Through the transmitter/receiver component 110, the network device 102 can concurrently transmit and receive data, can transmit and receive data at different times, or combinations thereof. According to some implementations, the transmitter/receiver component 110 can facilitate communications between the network device 102 and the UE device 104.

Further, the transmitter/receiver component 118 can be configured to transmit to, and/or receive data from, the network device 102, other network devices, and/or other UE devices. Through the transmitter/receiver component 118, the UE device 104 can concurrently transmit and receive data, can transmit and receive data at different times, or combinations thereof. According to some implementations, the transmitter/receiver component 118 can facilitate communications between the UE device 104 and the network device 102.

The at least one memory 112 can be operatively connected to the at least one processor 114. The at least one memory 112 can store executable instructions that, when executed by the at least one processor 114 can facilitate performance of operations. Further, the at least one processor 114 can be utilized to execute computer executable components stored in the at least one memory 112 and/or the at least one data store 116.

For example, the at least one memory 112 can store protocols associated with facilitating application and/or traffic status aware intelligent carrier aggregation in advanced networks as discussed herein. Further, the at least one memory 112 can facilitate action to control communication between the network device 102, the UE device 104, other network devices, and/or other UE devices such that the network device 102 can employ stored protocols and/or algorithms to achieve improved communications in a wireless network as described herein.

Further, the at least one memory 120 can be operatively connected to the at least one processor 122. The at least one memory 120 can store executable instructions that, when executed by the at least one processor 122 can facilitate performance of operations. Further, the at least one processor 122 can be utilized to execute computer executable components stored in the at least one memory 120 and/or the at least one data store 124.

For example, the at least one memory 120 can store protocols associated with facilitating application and/or traffic status aware intelligent carrier aggregation in advanced networks as discussed herein. Further, the at least one memory 120 can facilitate action to control communication between the UE device 104, the network device 102, other network devices, and/or other UE devices such that the UE device 104 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 114 and/or the at least one processor 122 can facilitate respective analysis of information related to facilitating application and/or traffic status aware intelligent carrier aggregation in advanced networks. The at least one processor 114 and/or the at least one processor 122 can be a processor dedicated to analyzing and/or generating information received, a processor that controls one or more components of the network device 102, the UE device 104, and/or a processor that both analyzes and generates information received and controls one or more components of the network device 102 and/or the UE device 104.

Further, the term network device (e.g., network node, network node device) is used herein to refer to any type of network node serving communication devices and/or connected to other network nodes, network elements, or another network node from which the communication devices can receive a radio signal. In cellular radio access networks, network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
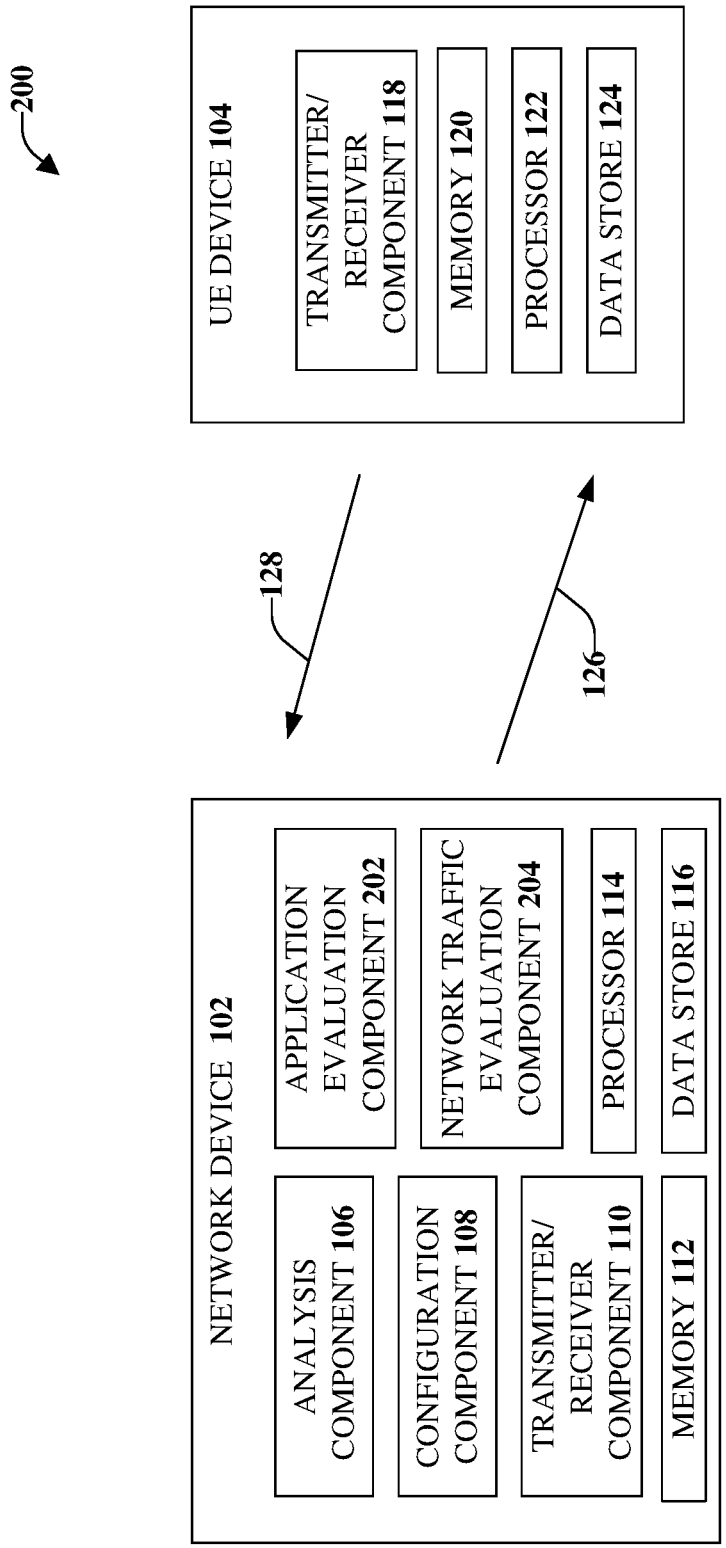
FIG. 2 illustrates an example, non-limiting, system that facilitates carrier aggregation based on one or more usage parameters of a user equipment device in advanced networks in accordance with one or more embodiments described herein.

FIG. 2 illustrates an example, non-limiting, system 200 that facilitates carrier aggregation based on one or more usage parameters of a user equipment device in advanced networks in accordance with one or more embodiments described herein. Repetitive description of like elements employed in other embodiments described herein is omitted for sake of brevity. The system 200 can comprise one or more of the components and/or functionality of the system 100 and vice versa.

As illustrated, the network device 102 can comprise an application evaluation component 202 and a network traffic evaluation component 204. The analysis component 106 can evaluate a usage parameter of the UE device 104. For example, the usage parameter can be an uplink centric usage parameter or a downlink centric usage parameter. Further, the configuration component 108 can, based on the usage parameter being the uplink centric usage parameter, configure the UE device 104 with an uplink carrier aggregation to maximize the number of carriers aggregated on the uplink. Thereafter, the configuration component can configure the UE device 104 with an allowable downlink carrier aggregation (e.g., determined by device parameters, device capacity, standards, policies, rules, and so on).

Alternatively, the configuration component 108 can, based on the usage parameter being the downlink centric usage parameter, configure the UE device 104 with a downlink carrier aggregation to maximize the number of carriers aggregated on the downlink. Thereafter, the configuration component can configure the UE device 104 with an allowable uplink carrier aggregation (e.g., determined by device parameters, device capacity, standards, policies, rules, and so on). Further, the configuration component 108 can configure the UE device 104 with the uplink carrier aggregation independently from a configuration of the UE device 104 with the downlink carrier aggregation.

According to some implementations, the carrier aggregation can switch between the uplink carrier aggregation and the downlink carrier aggregation based on changes associated with the usage parameter of the UE device 104. Accordingly, the uplink carrier aggregation and the downlink carrier aggregation can be non-static carrier aggregations (e.g., can change dynamically over time).

In accordance with some implementations, the usage parameter can be associated with an application executing on the UE device 104. Further to these implementations, the application evaluation component 202 can determine the usage parameter is the uplink centric usage parameter based on a first utilization of uplink resources by the application executing on the UE device 104 being more than a second utilization of downlink resources by the application executing on the UE device 104. Alternatively, the application evaluation component 202 can determine the usage parameter is the downlink centric usage parameter based on a first utilization of downlink resources by the application executing on the UE device 104 being more than a second utilization of uplink resources by the application executing on the UE device 104.

According to some implementations, the usage parameter can be a network traffic pattern associated with the UE device 104. Thus, the network traffic evaluation component 204 can evaluate the traffic pattern. For example, the network traffic evaluation component 204 can determine the network traffic pattern is downlink centric based on a first quantity of downlink network traffic being received at the UE device 104 being larger than a second quantity of uplink network traffic being sent by the UE device 104. In another example, the network traffic evaluation component 204 can determine the network traffic pattern is uplink centric based on the second quantity of uplink network traffic being sent by the UE device 104 being larger than the first quantity of downlink network traffic being received at the UE device 104.

In accordance with some implementations, the network traffic evaluation component 204 can evaluate traffic associated with the UE device 104 and other UE devices within a wireless communications network, other than the UE device 104. For example, the network traffic evaluation component 204 can evaluate a first quantity of uplink network traffic and a second quantity of downlink network traffic, wherein the uplink network traffic and the downlink network traffic are associated with the UE device 104 and the other UE devices.

Figure 3:
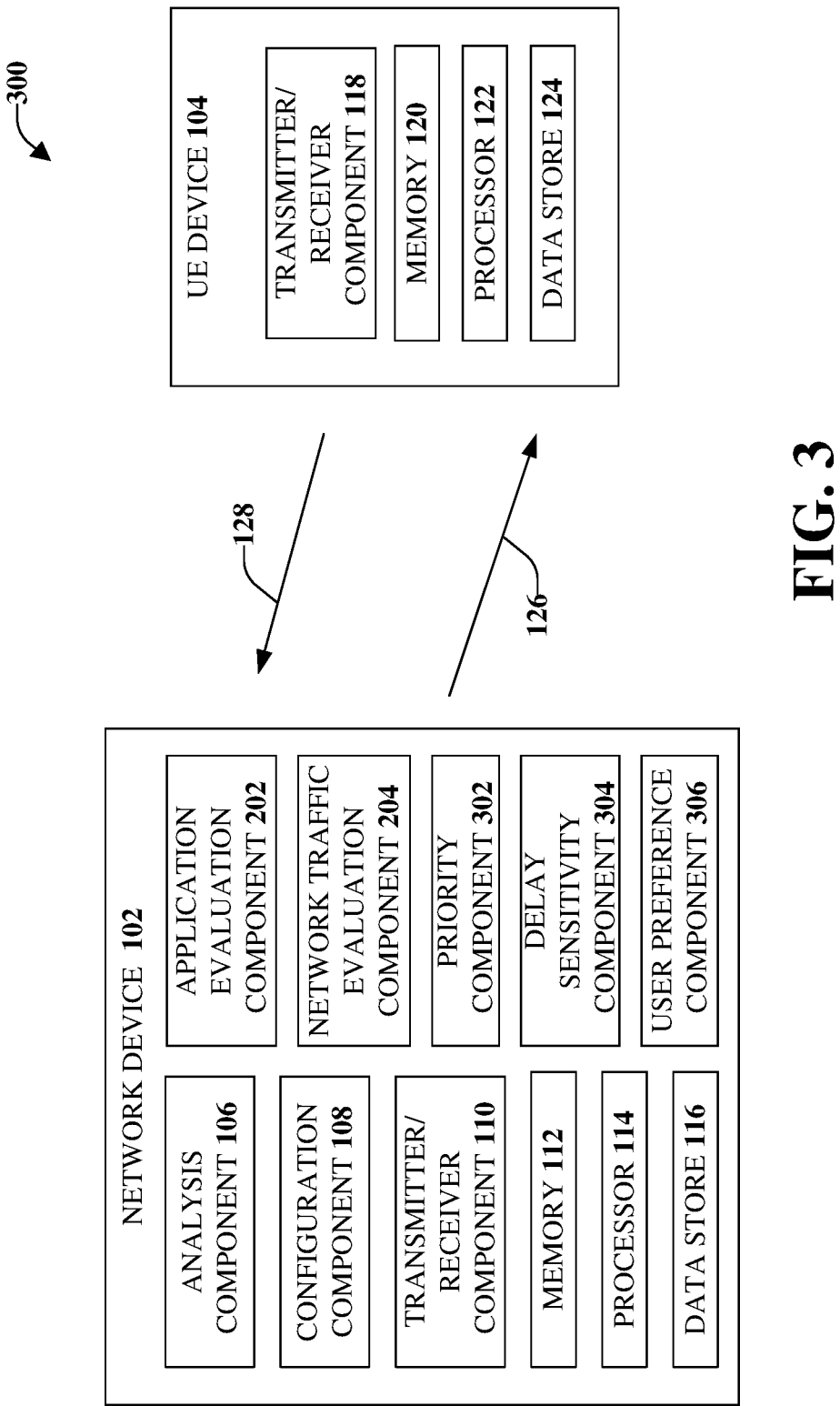
FIG. 3 illustrates an example, non-limiting, system that facilitates smart carrier aggregation that dynamically switches between an uplink carrier aggregation and a downlink carrier aggregation in advanced networks in accordance with one or more embodiments described herein.

FIG. 3 illustrates an example, non-limiting, system 300 that facilitates smart carrier aggregation that dynamically switches between an uplink carrier aggregation and a downlink carrier aggregation in advanced networks in accordance with one or more embodiments described herein. Repetitive description of like elements employed in other embodiments described herein is omitted for sake of brevity. The system 300 can comprise one or more of the components and/or functionality of the system 100, the system 200, and vice versa.

As discussed herein, the network device 102 can use intelligence when determining how to configure the uplink carrier aggregation and/or the downlink carrier aggregation. It is noted that the uplink and downlink carrier aggregations are not completely independent. For example, one or more factors can link the uplink and the downlink together (e.g., force interdependencies between the uplink and the downlink). An example, non-limiting, factor can be that the UE device 104 is only capable of supporting a certain amount of carrier to be aggregated, which is both on the uplink and the downlink.

Another example, non-limiting, factor can be related to one or more wireless communications standards. For example, a standard might define the carrier aggregation as three CC, the network device 102 should aggregate three carriers on the downlink plus two carriers on uplink. However, if the standard defines the carrier aggregation as four CC, the network device 102 should aggregate four carriers on the downlink. In this case, uplink is not able to be performed. In an example, the UE device only supports five CC total (but this is only an example).

As mentioned, traditional carrier aggregation is static. This means that if a downlink is favored, the network device attempts to get as many carriers to aggregate on the downlink as possible, then the network device goes to the uplink (if possible). However, if the UE device is uploading a video, for example, the focus should be on the uplink aggregation, but is not possible due to the static (or unchangeable) favoring of the downlink.

Alternatively, if the uplink is favored, the network device attempts to get as many carriers to aggregate on the uplink as possible, then the network device goes to the downlink (if possible). This can be a problem because if there is an application executing on the UE device that is mostly downlink centric, the network device should aggregate as many downlink carriers as possible. However, since the uplink is favored, this is not possible due to the static nature of the carrier aggregation.

In contrast, the carrier aggregation of the disclosed aspects is not static but can change between downlink and uplink. The change or dynamic switching can be based on the most important application and/or traffic, regardless of if the application and/or traffic is uplink centric or downlink centric.

In some implementations, the network traffic pattern can be almost equally split between the downlink centric and the uplink centric. For example, an amount of downlink network traffic can be nearly identical to the amount of uplink network traffic experienced by the UE device 104. In another example, two (or more) applications could be executing on the UE device 104, where a first application is downlink centric and a second application is uplink centric.

Accordingly, the network device 102 can comprise a priority component 302, a delay sensitivity component 304, and a user preference component 306. The priority component 302 can determine respective priorities of the network traffic and/or the two applications. For example, the priority component 302 can compare a first priority of downlink network traffic with a second priority of uplink network traffic. In another example, the priority component 302 can compare a first priority of an uplink centric application with a second priority of a downlink centric application. Based on the priority determined by the priority component 302, the configuration component 108 can configure the carrier aggregation appropriately for the current situation, which can change over time.

The delay sensitivity component 304 can evaluate delay sensitivity associated with a downlink and an uplink. For example, a first delay sensitivity of a downlink can be more sensitive than a second delay sensitivity of an uplink, which can indicate that the downlink, in this case, is more important than the uplink. Accordingly, the configuration component 108 can configured the UE device 104 with downlink carrier aggregation.

Further, the user preference component 306 can be configured to determine one or more user preferences. For example, the user preference component 306 can receive a direct indication from the user of the preferences (e.g., specific information received). Alternatively, or additionally, the user preference component 306 can infer the user preference based on historical data, such as how the user has requested similar data to be handled previously, or other actions performed by the user. For example, if two applications were executing on the UE device, the user might have historically discontinued one of the applications, while allowing the other application to continue to execute. It can be inferred by this that the other application was more important to the user. Accordingly, the analysis component 106 can factor into its analysis the one or more user preferences indicated by the user preference component 306.

By intelligently configuring the uplink carrier aggregation and the downlink carrier aggregation combination as discussed herein (e.g., based on the application and/or traffic status), the UE device 104 can be configured to use the optimal uplink carrier aggregation and the downlink carrier aggregation combination to have the highest possible data rate most suitable for the application and/or traffic.

For example purposes and not limitation, and using the example discussed herein, if uplink carrier aggregation is enabled as discussed herein and compared to traditional uplink carrier aggregation (e.g., uplink carrier aggregation is not activated due to existing ineffective uplink/downlink carrier aggregation configuration solution), a potential gain of up to one hundred percent speed can be achieved. Accordingly, the possible peak speed can be doubled (two CC carrier aggregation versus no carrier aggregation) with the disclosed aspects.

In an example, for downlink, if five CC carrier aggregation is enabled as discussed herein, compared to if only downlink three CC carrier aggregation is activated due to tradition ineffective uplink/downlink carrier aggregation configuration solution, a potential gain of around 66% speed could be achieved.

Figure 4:
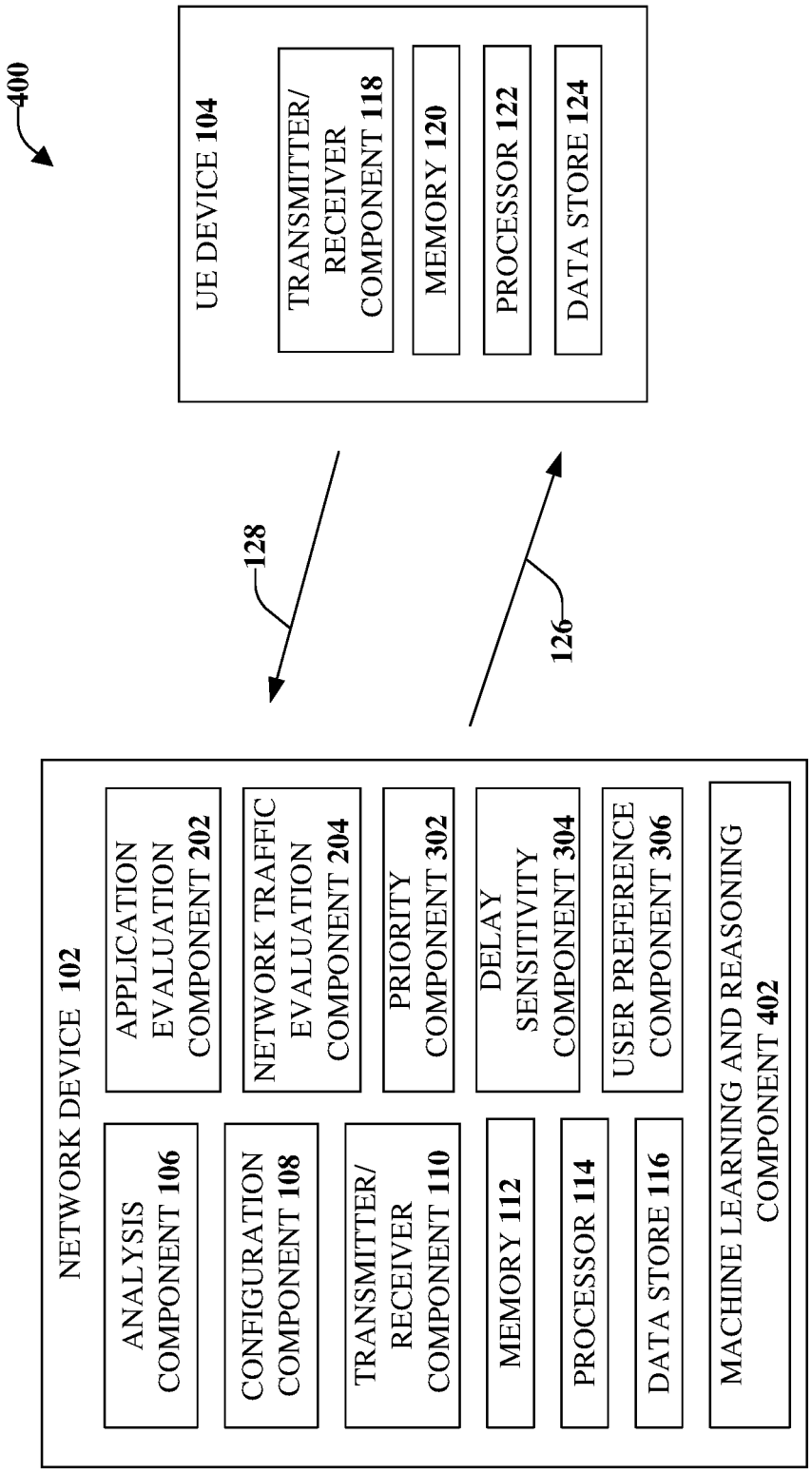
FIG. 4 illustrates an example, non-limiting, system that employs automated learning to facilitate one or more of the disclosed aspects in accordance with one or more embodiments described herein.

FIG. 4 illustrates an example, non-limiting, system 400 that employs automated learning to facilitate one or more of the disclosed aspects in accordance with one or more embodiments described herein. Repetitive description of like elements employed in other embodiments described herein is omitted for sake of brevity. The system 400 can comprise one or more of the components and/or functionality of the system 100, the system 200, the system 300, and vice versa.

As illustrated, the system 400 can comprise a machine learning and reasoning component 402 that can be utilized to automate one or more of the disclosed aspects. The machine learning and reasoning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models constructed using machine learning and/or automated learning procedures. Logic-centric inference can also be employed separately or in conjunction with probabilistic methods.

The machine learning and reasoning component 402 can infer whether a usage parameter of the UE device 104 is an uplink centric usage parameter or a downlink centric usage parameter by obtaining knowledge about one or more applications executing on the UE device 104, downlink network traffic, and/or uplink network traffic. Based on this knowledge, the machine learning and reasoning component 402 can make an inference based on whether to implement downlink carrier aggregation or uplink carrier aggregation, whether to switch from an uplink to a downlink carrier aggregation, whether to switch from a downlink to an uplink carrier aggregation, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify respective importance of a downlink and an uplink, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., facilitating intelligent carrier aggregation) can employ various artificial intelligence-based schemes for carrying out various aspects thereof. For example, a process for determining if a particular data link is more important than another data link (e.g., an uplink, a downlink) can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what type of carrier aggregation should be automatically performed. In the case of centricity, for example, attributes can be identification of a downlink centric usage parameter and an uplink centric usage parameter and the classes are criteria of the applications executing on the UE device 104, network traffic, priorities, delay sensitivities, user preferences, and so on.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing user behavior, by receiving extrinsic information, by analyzing historical information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to implement a downlink carrier aggregation, an uplink carrier aggregation, and/or when to switch from one carrier aggregation to the other carrier aggregation (e.g., from downlink to uplink, from uplink to downlink).

Additionally, or alternatively, an implementation scheme (e.g., a rule, a policy, and so on) can be applied to control and/or regulate carrier aggregation as discussed herein. In some implementations, based upon a predefined criterion, the rules-based implementation can automatically and/or dynamically facilitate carrier aggregation. In response thereto, the rule-based implementation can automatically interpret and carry out functions associated with the carrier aggregation by employing a predefined and/or programmed rule(s) based upon any desired criteria.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
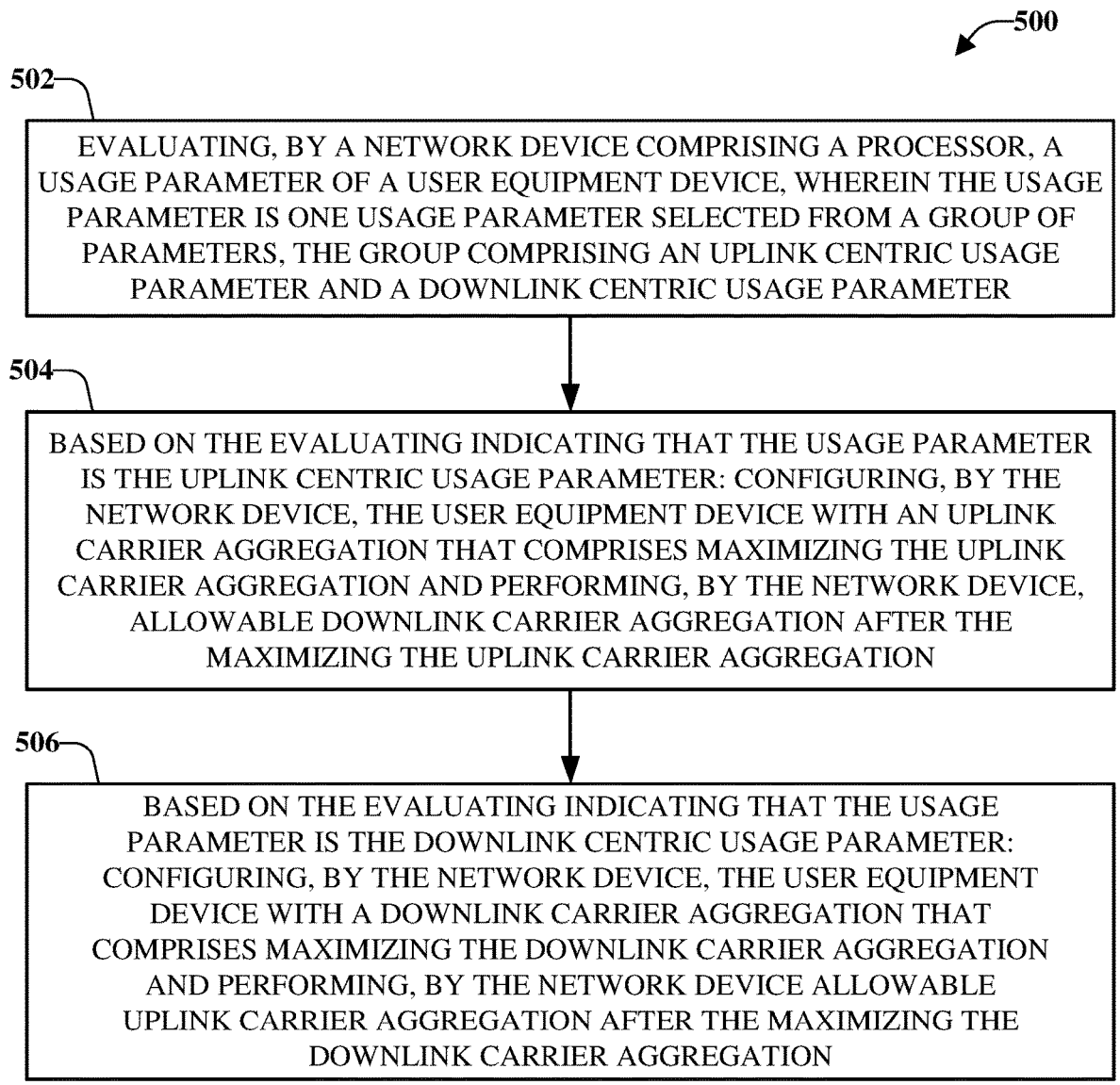
FIG. 5 illustrates a flow diagram of an example, non-limiting, computer-implemented method for facilitating smart carrier aggregation in advanced networks in accordance with one or more embodiments described herein.

FIG. 5 illustrates a flow diagram of an example, non-limiting, computer-implemented method 500 for facilitating smart carrier aggregation in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a network device can evaluate a usage parameter of a user equipment device (e.g., via the analysis component 106). The usage parameter can be one usage parameter selected from a group of parameters, the group comprising an uplink centric usage parameter and a downlink centric usage parameter.

In an example, evaluating the usage parameter can comprise analyzing a network traffic pattern associated with the user equipment device. The network traffic pattern can be determined to be downlink centric based on a first quantity of downlink network traffic being received at the user equipment device being determined to be larger than a second quantity of uplink network traffic being sent by the user equipment device. Alternatively, the network traffic pattern can be determined to be uplink centric based on the second quantity of uplink network traffic being sent by the user equipment device being determined to be larger than the first quantity of downlink network traffic being received at the user equipment device.

According to another example, evaluating the usage parameter can comprise analyzing an application executing on the user equipment device. Further to this example, determining the usage parameter is the uplink centric usage parameter can be based on a first utilization of uplink resources by the application executing on the user equipment device being determined to be more than a second utilization of downlink resources by the application executing on the user equipment device. Alternatively, the usage parameter can be determined to be the downlink centric usage parameter based on a first utilization of downlink resources by the application executing on the user equipment device being determined to be more than a second utilization of uplink resources by the application executing on the user equipment device.

Based on the evaluation indicating that the usage parameter is the uplink centric usage parameter, at 504 the network device can configure the user equipment device with an uplink carrier aggregation that comprises maximizing the uplink carrier aggregation and performing allowable downlink carrier aggregation after the maximizing the uplink carrier aggregation (e.g., via the configuration component 108). To maximize the uplink carrier aggregation, as many carriers are aggregated on the uplink as possible. Further the allowable downlink carrier aggregation can be determined based on device capacity, standards, rules, policies, and so on.

Alternatively, based on the evaluation indicating that the usage parameter is the downlink centric usage parameter, at 506 the network device can configure the user equipment device with a downlink carrier aggregation that comprises maximizing the downlink carrier aggregation and performing allowable uplink carrier aggregation after the maximizing the downlink carrier aggregation (e.g., via the configuration component 108). The uplink carrier aggregation and the downlink carrier aggregation can be non-static carrier aggregations. To maximize the downlink carrier aggregation, as many carriers are aggregated on the downlink as possible. Further the allowable uplink carrier aggregation can be determined based on device capacity, standards, rules, policies, and so on.

According to some implementations, evaluating the usage parameter can comprise analyzing a first priority of uplink network traffic and a second priority of downlink network traffic. In accordance with some implementations, evaluating the usage parameter can comprise comparing a first delay sensitivity of an uplink communication with a second delay sensitivity of a downlink communication.

In some implementations, the method can comprise evaluating a first quantity of uplink network traffic and a second quantity of downlink network traffic. The uplink network traffic and the downlink network traffic can be associated with the user equipment device and other user equipment devices within a wireless communications network other than the user equipment device.

Further, the method can comprise facilitating a transmission of a configuration message to the user equipment device. The configuration message can comprise a first indication of the uplink carrier aggregation based on the evaluation indicating that the usage parameter is the uplink centric usage parameter, or a second indication of the downlink carrier aggregation based on the evaluation indicating that the usage parameter is the downlink centric usage parameter. In an example, facilitating the transmission can comprise sending the transmission as a radio resource control configuration message.

Figure 6:
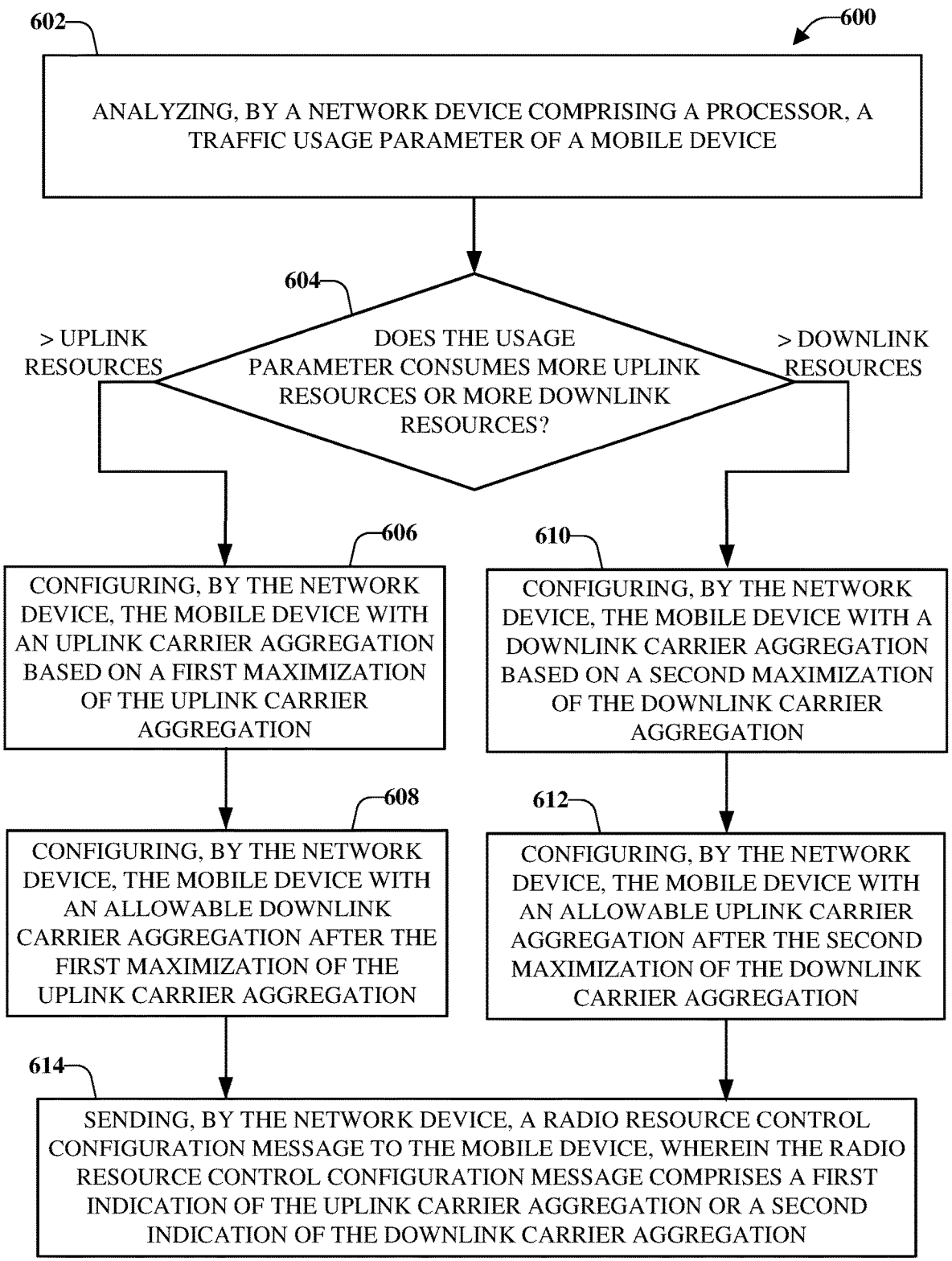
FIG. 6 illustrates a flow diagram of an example, non-limiting, computer-implemented method for facilitating carrier aggregation based on traffic usage parameters in advanced networks in accordance with one or more embodiments described herein.

FIG. 6 illustrates a flow diagram of an example, non-limiting, computer-implemented method 600 for facilitating carrier aggregation based on traffic usage parameters in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a network device can analyze a traffic usage parameter of a mobile device (e.g., via the network traffic evaluation component 204). It is noted that although discussed with respect to a single network device and a single mobile device, the disclosed aspects are not limited to this implementation and there can be more than one network device and/or more than one mobile device utilized with the disclosed aspects.

At 604, a determination can be made whether the usage parameter consumes more uplink resources or more downlink resources (e.g., via the analysis component 106). If the determination is that more uplink resources are used than downlink resources, at 606 of the computer-implemented method 600, the network device can configure the mobile device with an uplink carrier aggregation based on a first maximization of the uplink carrier aggregation (e.g., via the configuration component 108). Upon or after the first maximization of the uplink carrier aggregation, at 608, the network device can configure the mobile device with an allowable downlink carrier aggregation (e.g., via the configuration component 108).

Alternatively, if the determination is that more downlink resources are used than uplink resources, at 610 of the computer-implemented method 600, the network device can configure the mobile device with a downlink carrier aggregation based on a second maximization of the downlink carrier aggregation (e.g., via the configuration component 108). Upon or after the second maximization of the downlink carrier aggregation, at 612, the network device can configure the mobile device with an allowable uplink carrier aggregation after the second maximization of the downlink carrier aggregation.

It is to be understood that the usage parameter analysis at 602 and the carrier aggregation at 606, 608 and/or 610, 612 can be recursive, such that selective switching between uplink carrier aggregation and downlink carrier aggregation can be performed based on changing conditions at the mobile device and/or within the communications network can be addressed. For example, the network device can analyze another traffic usage pattern of the mobile device after a defined interval. The defined interval can be defined continuously, periodically, at variable intervals, or based on one or more other parameters (e.g., an application executing on the mobile device has changed, a traffic pattern has changed, network traffic has become congested, network traffic is no longer congested, and so on). According to some implementations, the defined interval can be continuous or continually monitoring of the traffic usage parameters.

Based on the analysis of the other traffic usage pattern of the mobile device, one or more subsequent actions of a subsequent group of actions can be performed. For example, based on a determination that the other traffic usage pattern indicates a consumption of more uplink resources than downlink resources, the network device can configure the mobile device with the uplink carrier aggregation (which might be the same as a previous configuration or different than the previous configuration). Alternatively, based on a determination that the other traffic usage pattern indicates a consumption of more downlink resources than uplink resources, the network device can configure the mobile device with the downlink carrier aggregation (which might be the same as a previous configuration or different than the previous configuration). Thus, the uplink carrier aggregation and the downlink carrier aggregation are non-static carrier aggregations as discussed herein.

In some implementations, the uplink resources and the downlink resources consumed could be nearly the same. Therefore, other parameters can be evaluated to determine if the mobile device should be configured with uplink carrier aggregation or downlink carrier aggregation. Such parameters include, but are not limited to, priority of an application and/or communication, a user subscription level agreement, a delay sensitivity of an application and/or communication, user preferences, historic information, and so on.

Further, upon or after configuring the mobile device with the uplink carrier aggregation (at 606) and allowable downlink carrier aggregation (at 608), or after configuring the mobile device with the downlink carrier aggregation (at 610) and allowable uplink carrier aggregation (at 612), the network device can send a radio resource control configuration message to the mobile device, at 614 of the computer-implemented method 600 (e.g., via the transmitter/receiver component 110). The radio resource control configuration message can comprise a first indication of the uplink carrier aggregation or a second indication of the downlink carrier aggregation.

Figure 7:
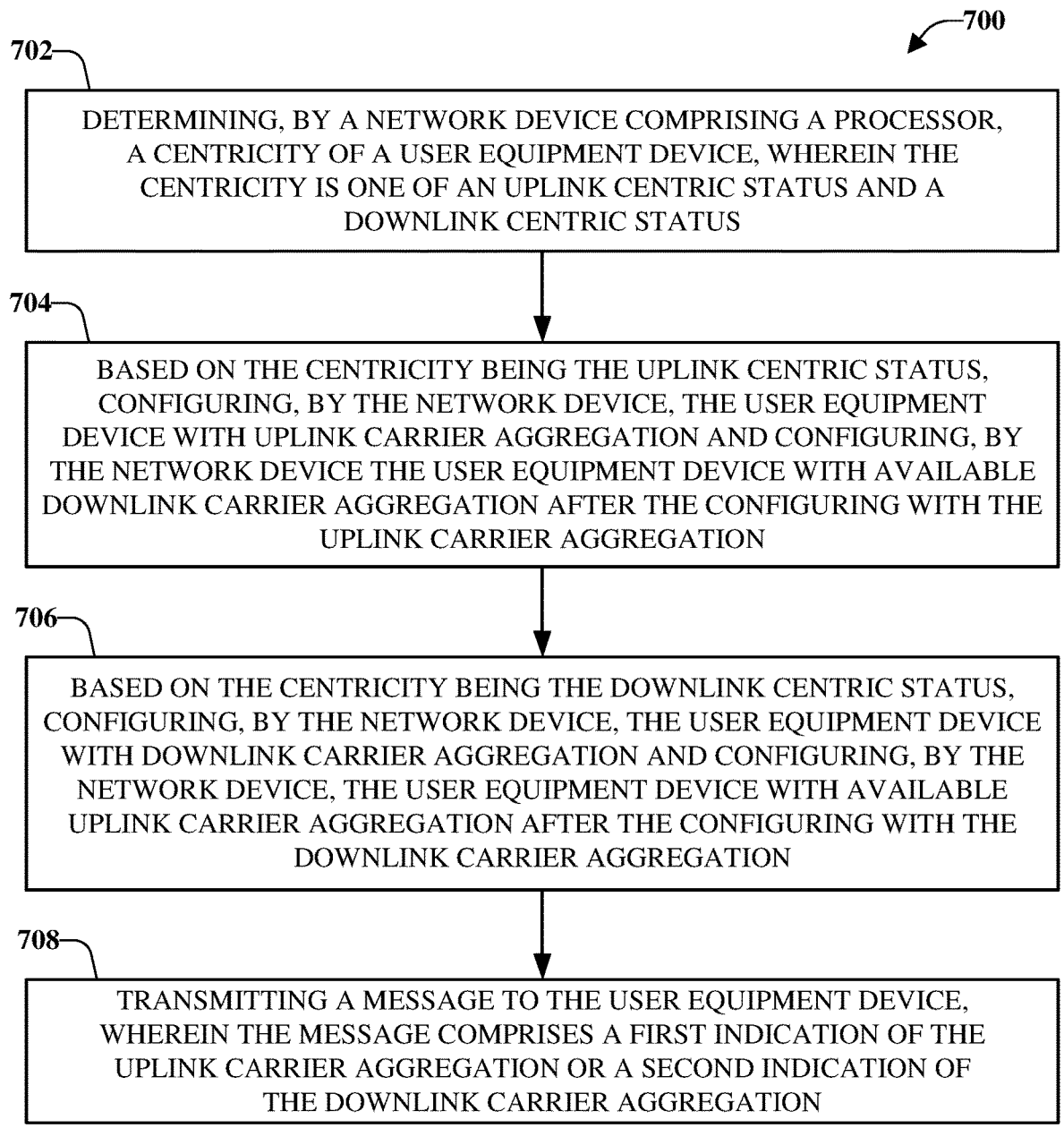
FIG. 7 illustrates a flow diagram of an example, non-limiting, computer-implemented method for facilitating carrier aggregation based on an application executing on the user equipment device in advanced networks in accordance with one or more embodiments described herein.

FIG. 7 illustrates a flow diagram of an example, non-limiting, computer-implemented method 700 for facilitating carrier aggregation based on an application executing on the user equipment device in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a network device can determine a centricity of a user equipment device (e.g., via the analysis component 106 and/or the application evaluation component 202). The centricity can be one of an uplink centric status and a downlink centric status. For example, determining the centricity of the user equipment device can comprise evaluating the centricity of an application executing on the user equipment device. It is noted that although the computer-implemented method 700 is discussed with respect to an application executing on the user equipment device, the centricity could also apply to network traffic.

Based on the centricity being the uplink centric status, at 704, the network device can configure the user equipment device with uplink carrier aggregation and can configure the user equipment device with available downlink carrier aggregation after the configuring with the uplink carrier aggregation (e.g., via the configuration component 108). Alternatively, at 706, based on the centricity being the downlink centric status, the network device can configure the user equipment device with downlink carrier aggregation and can configure the user equipment device with available uplink carrier aggregation after the configuring with the downlink carrier aggregation (e.g., via the configuration component 108).

Further, at 708 of the computer-implemented method 700, the network device can transmit a message to the user equipment device (e.g., via the transmitter/receiver component 110). The message can be a radio resource control configuration message. Further, the method can comprise a first indication of the uplink carrier aggregation or a second indication of the downlink carrier aggregation.

Described herein are systems, methods, articles of manufacture, and other embodiments or implementations that can facilitate application and/or traffic status aware intelligent carrier aggregation in advanced networks. Facilitating application and/or traffic status aware intelligent carrier aggregation can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system.

Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), a Remote Radio Head (RRH), nodes in Distributed Antenna System (DAS) etc.

The various aspects described herein can relate to NR, which can be deployed as a standalone radio access technology or as a non-standalone radio access technology assisted by another radio access technology, such as LTE, for example.

It should be noted that although various aspects and embodiments have been described herein in the context of 5G and/or Long Term Evolution (LTE), or other next generation networks, the disclosed aspects are not limited to 5G and/or an LTE implementation as the disclosed aspects can also be applied in 3G, 4G, 5G, or LTE systems. For example, aspects or features of the disclosed embodiments can be exploited in substantially any wireless communication technology. Such wireless communication technologies can include, but are not limited to, Code Division Multiple Access (CDMA), Wireless Fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Figure 8:
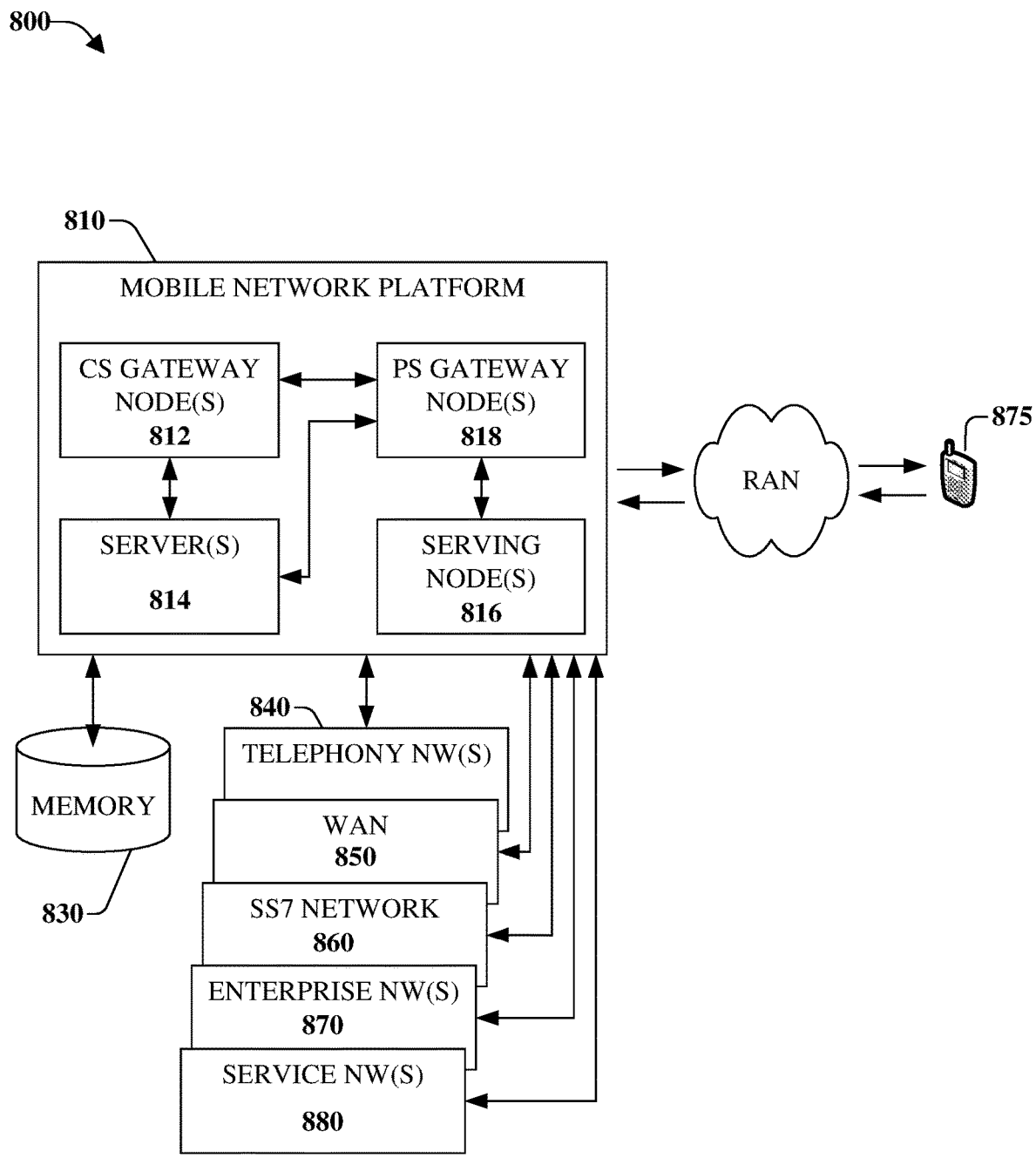
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
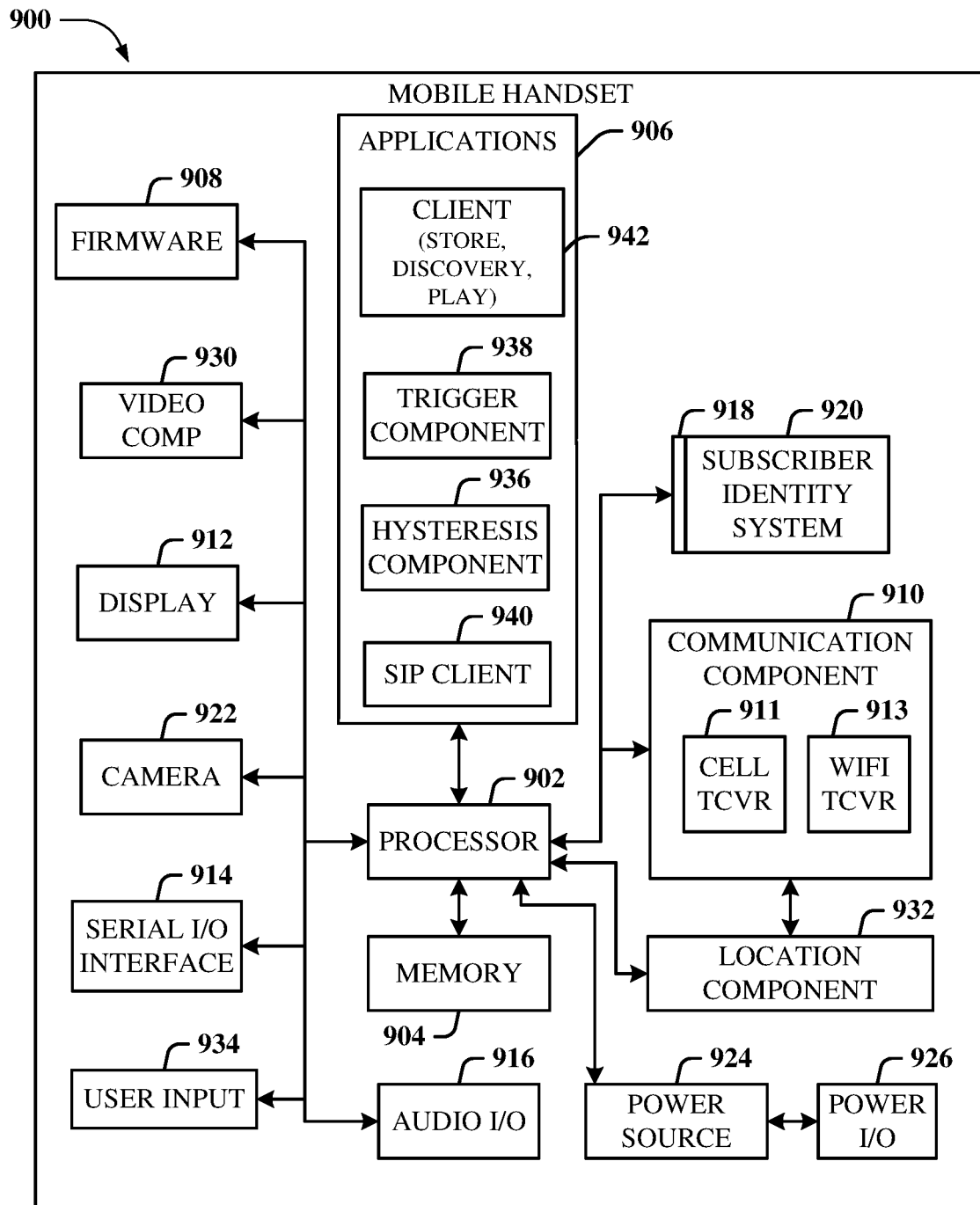
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
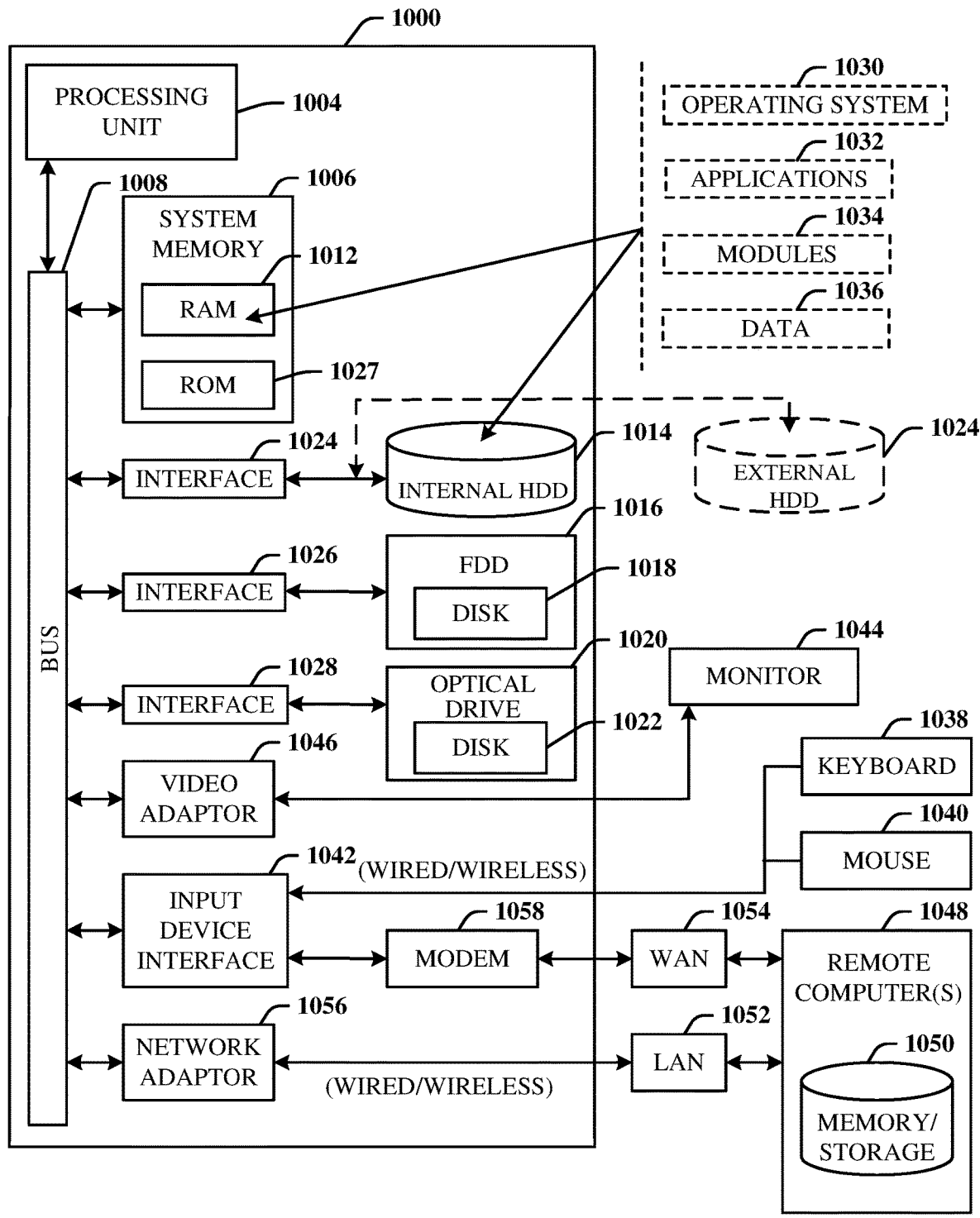
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random-access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Systems, methods and/or machine-readable storage media for a group hybrid automatic repeat request procedure for sidelink group-case in advanced networks are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. Network equipment, comprising:
a processor; and
a memory that stores executable instructions that, when executed by the processor, facilitate performance of operations, comprising:
  evaluating a usage parameter of a user equipment, wherein the usage parameter is one usage parameter selected from a group of parameters, the group comprising an uplink centric usage parameter and a downlink centric usage parameter, wherein the evaluating comprises analyzing an application executing on the user equipment, and
  based on a first utilization of uplink resources by the application executing on the user equipment being determined to be more than a second utilization of downlink resources by the application executing on the user equipment:
    determining the usage parameter is the uplink centric usage parameter,
    configuring the user equipment with an uplink carrier aggregation that comprises maximizing the uplink carrier aggregation, and
    performing allowable downlink carrier aggregation after the maximizing the uplink carrier aggregation; and
  based on the second utilization of downlink resources by the application executing on the user equipment being determined to be more than the first utilization of uplink resources by the application executing on the user equipment:
    determining that the usage parameter is the downlink centric usage parameter,
    configuring the user equipment with a downlink carrier aggregation that comprises maximizing the downlink carrier aggregation, and
    performing allowable uplink carrier aggregation after the maximizing the downlink carrier aggregation.

2. The network equipment of claim 1, wherein the evaluating comprises analyzing a network traffic pattern associated with the user equipment.

3. The network equipment of claim 2, wherein the operations further comprise:
determining the network traffic pattern is downlink centric based on a first quantity of downlink network traffic being received at the user equipment being determined to be larger than a second quantity of uplink network traffic being sent by the user equipment; and
determining the network traffic pattern is uplink centric based on the second quantity of uplink network traffic being sent by the user equipment being determined to be larger than the first quantity of downlink network traffic being received at the user equipment.

4. The network equipment of claim 1, wherein the uplink carrier aggregation and the downlink carrier aggregation are non-static carrier aggregations.

5. The network equipment of claim 1, wherein the evaluating comprises analyzing a first priority of uplink network traffic and a second priority of downlink network traffic.

6. The network equipment of claim 1, wherein the operations further comprise:
evaluating a first quantity of uplink network traffic and a second quantity of downlink network traffic, wherein the first quantity of uplink network traffic and the second quantity of downlink network traffic are associated with the user equipment and other user equipment within a wireless communications network other than the user equipment.

7. The network equipment of claim 1, wherein the evaluating comprises comparing a first delay sensitivity of an uplink communication with a second delay sensitivity of a downlink communication.

8. The network equipment of claim 1, wherein the operations further comprise facilitating a transmission of a configuration message to the user equipment, and wherein the configuration message comprises a first indication of the uplink carrier aggregation based on the evaluating indicating that the usage parameter is the uplink centric usage parameter, or a second indication of the downlink carrier aggregation based on the evaluating indicating that the usage parameter is the downlink centric usage parameter.

9. The network equipment of claim 8, wherein the facilitating comprises sending the transmission as a radio resource control configuration message.

10. A method, comprising:
analyzing, by network equipment comprising a processor, a traffic usage parameter of a mobile device, wherein the analyzing comprises evaluating an application executing on the mobile device; and
performing one action from a group of actions depending on a result of the analyzing, the group of actions comprising:
based on a first determination that the traffic usage parameter is an uplink centric usage parameter based on a first utilization of uplink resources by the application executing on the mobile device being more than a second utilization of downlink resources by the application executing on the mobile device:
configuring, by the network equipment, the mobile device with an uplink carrier aggregation based on a first maximization of the uplink carrier aggregation, and
configuring, by the network equipment, the mobile device with an allowable downlink carrier aggregation after the first maximization of the uplink carrier aggregation; and
based on a second determination that the traffic usage parameter is a downlink centric usage parameter based on the second utilization of downlink resources by the application executing on the mobile device being determined to be more than the first utilization of uplink resources by the application executing on the mobile device:
configuring, by the network equipment, the mobile device with a downlink carrier aggregation based on a second maximization of the downlink carrier aggregation, and
configuring, by the network equipment, the mobile device with an allowable uplink carrier aggregation after the second maximization of the downlink carrier aggregation.

11. The method of claim 10, wherein the one action of the group of actions is one initial action of an initial group of actions, wherein the traffic usage parameter is a first traffic usage parameter, and wherein the method further comprises:
analyzing, by the network equipment, a second traffic usage pattern of the mobile device after a defined interval; and
performing one subsequent action of a subsequent group of actions, the subsequent group of actions comprising:
based on a third determination that the second traffic usage pattern indicates a consumption of more uplink resources than downlink resources, configuring, by the network equipment, the mobile device with the uplink carrier aggregation; and
based on a fourth determination that the second traffic usage pattern indicates a consumption of more downlink resources than uplink resources, configuring, by the network equipment, the mobile device with the downlink carrier aggregation.

12. The method of claim 11, wherein the uplink carrier aggregation and the downlink carrier aggregation are non-static carrier aggregations.

13. The method of claim 10, further comprising:
sending, by the network equipment, a radio resource control configuration message to the mobile device, wherein the radio resource control configuration message comprises a first indication of the uplink carrier aggregation or a second indication of the downlink carrier aggregation.

14. A non-transitory machine-readable medium, comprising executable instructions that, when executed by a processor, facilitate performance of operations, comprising:
determining a centricity of a user equipment, wherein the centricity is one from a group of statuses comprising an uplink centric status and a downlink centric status, wherein the determining comprises:
analyzing an application executing on the user equipment, and
based on a first utilization of uplink resources by the application executing on the user equipment being determined to be more than a second utilization of downlink resources by the application executing on the user equipment, determining the centricity is the uplink centric status and, based on the centricity being the uplink centric status:
configuring the user equipment with uplink carrier aggregation, and
configuring the user equipment with available downlink carrier aggregation after the configuring with the uplink carrier aggregation; or
based on the second utilization of downlink resources by the application executing on the user equipment being determined to be more than the first utilization of uplink resources by the application executing on the user equipment, determining the centricity is the downlink centric status and, based on the centricity being the downlink centric status:
configuring the user equipment with downlink carrier aggregation, and
configuring the user equipment with available uplink carrier aggregation after the configuring with the downlink carrier aggregation.

15. The non-transitory machine-readable medium of claim 14, wherein the determining of the centricity of the user equipment comprises evaluating a network traffic usage associated with the user equipment, and wherein the operations further comprise:
 based on a determination that the network traffic usage consumes more uplink resources than downlink resources, configuring the user equipment with the uplink carrier aggregation prior to the configuring of the user equipment with the available downlink carrier aggregation.

16. The non-transitory machine-readable medium of claim 14, wherein the determining of the centricity of the user equipment comprises evaluating a network traffic usage associated with the user equipment, and wherein the operations further comprise:
 based on a determination that the traffic usage pattern consumes more downlink resources than uplink resources, configuring the user equipment with the downlink carrier aggregation prior to the configuring of the user equipment with the available uplink carrier aggregation.

17. The non-transitory machine-readable medium of claim 14, wherein the operations further comprise transmitting a radio resource control configuration message to the user equipment, wherein the radio resource control configuration message comprises a first indication of the uplink carrier aggregation or a second indication of the downlink carrier aggregation.

18. The non-transitory machine-readable medium of claim 14, wherein the uplink carrier aggregation and the downlink carrier aggregation are non-static carrier aggregations.

19. The non-transitory machine-readable medium of claim 14, wherein the determining comprises comparing a first delay sensitivity of an uplink communication with a second delay sensitivity of a downlink communication.

20. The non-transitory machine-readable medium of claim 14, wherein the determining comprises analyzing a first priority of uplink network traffic and a second priority of downlink network traffic.

\* \* \* \* \*